United States Patent [19]

Dawson

[11] 4,140,238

[45] Feb. 20, 1979

[54] NOZZLE SHUT-OFF VALVE

[75] Inventor: James E. Dawson, Lebanon, Ohio

[73] Assignee: Cincinnati Milacron Inc., Cincinnati, Ohio

[21] Appl. No.: 850,686

[22] Filed: Nov. 11, 1977

Related U.S. Application Data

[63] Continuation-in-part of Ser. No. 702,481, Jul. 6, 1976, Pat. No. 4,073,944.

[51] Int. Cl.² .............................................. B29F 1/03
[52] U.S. Cl. .................................... 222/495; 222/504; 222/545; 251/31; 425/225; 425/562
[58] Field of Search .............. 222/495, 496, 504, 545; 251/28, 31; 425/225, 562, DIG. 224, DIG. 225, 146

[56] References Cited

U.S. PATENT DOCUMENTS

| | | | |
|---|---|---|---|
| 2,781,025 | 2/1957 | Loevy, Jr. | 251/31 X |
| 3,500,501 | 3/1970 | Johansson | 425/DIG. 224 |
| 3,746,486 | 7/1973 | Koster | 425/146 |

*Primary Examiner*—David A. Scherbel
*Attorney, Agent, or Firm*—Daniel P. Worth

[57] ABSTRACT

A nozzle shut-off valve for injection molding machine for plastic material, especially thermoplastic material, has two pneumatic cylinder-and-plunger units. One such unit has its plunger mounted to reciprocate so as to block the passageway of the plastics through the nozzle. The first such plunger and cylinder unit is provided with a pilot passage in the valve nozzle so that the pressure of molten plastic can be used to open it. The second such unit is much smaller diameter and has its plunger mounted to block the pilot passage so that the second unit in effect becomes a pilot valve and controls the application of fluid pressure through the pilot passage to the first unit plunger or blocking plunger.

6 Claims, 5 Drawing Figures

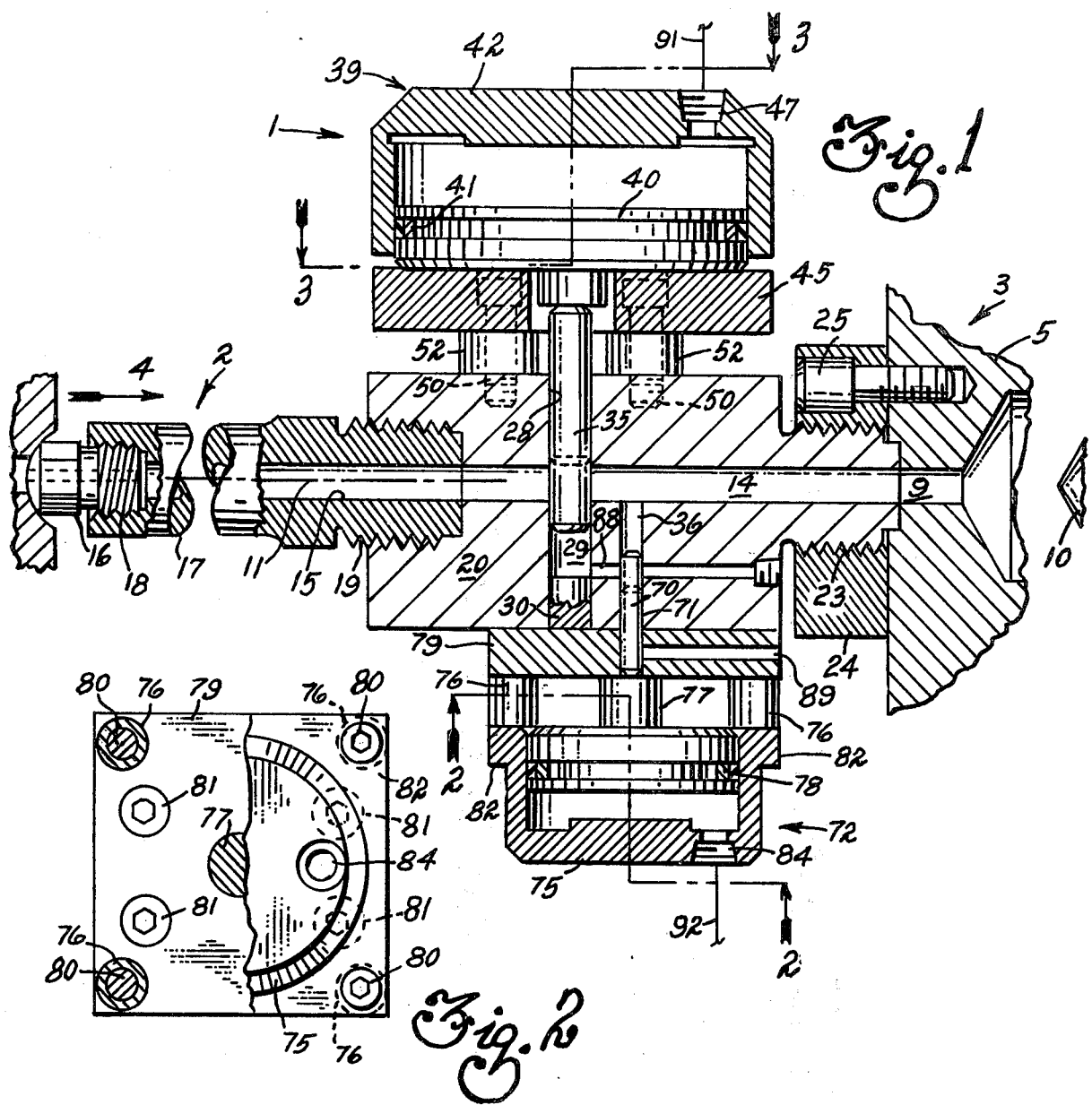
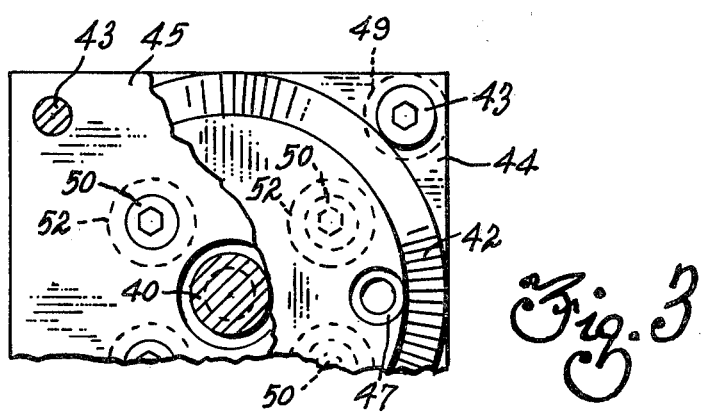

NOZZLE SHUT-OFF VALVE

SUMMARY AND BACKGROUND OF INVENTION

The present application is a continuation-in-part of my co-pending U.S. application Ser. No. 702,481 filed July 6, 1976, now U.S. Pat. No. 4,073,944.

The present invention provides a nozzle shut-off valve for use in an injection molding machine for plastic. One aspect of the invention relates to an improved nozzle shut-off valve having a pilot passage so located as to assist in opening the shut-off valve with the pressure of plastic from or in the injection unit, there being in addition a pilot valve located to open and close the aforesaid pilot passage. An aspect relates to an improved nozzle shut-off valve for use in reciprocating screw or plunger type injection molding machines of the kind used to mold plastic — especially thermoplastic — and elastomeric resin and which has a pilot valve located to control the application of the pressure of plastic material to the shut-off valve element or plunger. An aspect relates to a shut-off valve for use in plastic injection molding machines having a pneumatic pilot valve with a small diameter plunger that can block a small diameter pilot passageway for controlling the application of plastic pressure to a larger diameter plunger.

My said co-pending application is expressly incorporated herein by reference in its entirety.

Often a shut-off valve is employed to interrupt the flow of molten material from the plasticating unit through a nozzle into the mold or mold sprue. The shut-off valve in such case affords the advantages of minimizing or curtailing drool and provides a capability to plasticize during periods in the machine cycle when it would otherwise not be feasible to plasticize the plastic, e.g. when the mold is open.

As explained in my co-pending case, substantial force is necessary to open a nozzle shut-off valve preparatory to injection cycle. The invention described there facilitated opening of the shut-off valve while at the same time reducing the size of the fluid motor used for opening by a carefully located pilot passageway that applied the pressure of the molten plastic itself to open the shut-off valve preparatory to injection.

Large diameter nozzle passageways (0.750 diameter and larger) have been found to present special problems when the pilot passage of the co-pending application is employed to assist in opening the valve at proper times. The reason for this is that the large diameter nozzle passageway requires a correspondingly large diameter plunger as the means to open and close the same in unison with machine operation. This large diameter when combined with the hydraulic pressure of the molten plastic compels the use either of an extremely large diameter pneumatic or hydraulic piston (pneumatic being preferred) or a greatly increased air pressure, or some combination of the latter two.

Before progressing further, I should mention that large diameter flow passageway in nozzles are provided for large shots (i.e. volume of plastic at each injection), short cycle time to shoot, or a combination of large size and short time for injection. There are other situations also for the need for a large diameter passageway arises.

The present invention eliminates the need for providing extra high air pressure or an extra large size piston and plunger by providing a much smaller diameter plunger and air cylinder for controlling the application of opening pressure through the pilot passageway. Indeed, the plunger of this small diameter unit is interposed directly in the small diameter pilot passageway to effectuate this. Thus, the present invention contemplates two valve units and their drive means combined with the nozzle assembly, the valve units being of different diameters in accordance with the size of the passageways that they block with the smaller of the two blocking a pilot passageway that controls the application of opening pressure to the other unit.

In combination with a nozzle shut-off device that is for use with and at a location between the nozzle and plastication-injection unit of a plastic injection molding machine wherein the nozzle has a substantially straight first passageway that is substantially coaxial with the exit passage from the plastication-injection unit and wherein the shut-off device includes a body member that is interposed between the nozzle and such injection unit and has a substantially straight shut-off passageway therethrough that becomes coaxial with said first and exit passages, a laterally extending plunger slidably fitted in a bore which intersects the shut-off passageway in the body and which has a length and size sufficient to completely block shut-off passageway and a plunger drive means engaging one end of said plunger, a pilot chamber under the opposite end of said plunger and at one end of said lateral bore and a pilot passage extending from said chamber to a location upstream of the intersection of the bore and shut-off passageway, the present invention includes — a pilot bore intersecting said pilot passage; a pilot plunger slidably supported within the bore and of a size to block the bore and movable through a stroke to open and close the pilot bore; and a pilot drive means engaging the pilot plunger for driving the latter through its stroke to a position to close said bore and wherein said pilot and pilot plunger each has a cross-section less than the shut-off bore and shut-off plunger.

The present invention, as does the co-pending application provides a floating engagement between each valve element (herein a plunger) and each drive means in each valve unit in the preferred embodiment. This simplifies alignment problems but only permits operation in one direction because pneumatic pressure can push together the piston (drive means) and plunger in one direction only.

Other features and advantages of the present invention should be apparent by reference to the following specification and drawings wherein:

FIG. 1 is a side cross-section view of a nozzle shut-off device according to the invention which is interposed between the nozzle and the plasticizing cylinder;

FIG. 2 is a partial cutaway bottom view of the pilot valve drive front view of the nozzle shut-off along 2—2 of FIG. 1;

FIG. 3 is a partly cutaway section view taken along 3—3 of FIG. 1; and

Figure 4:
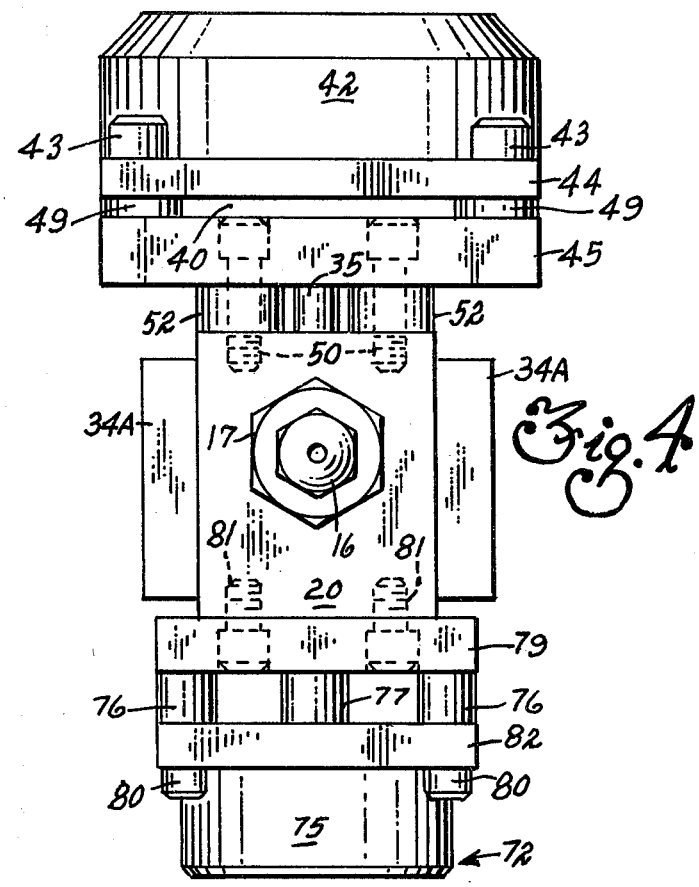
FIG. 4 is a front view of the valve and nozzle assembly as viewed from 4—4 of FIG. 1.

Those familiar with my co-pending application will note a great deal of similarity between the drawings for it and those for the present invention: the same numbers are used herein for parts the same as in the copending and new things are numbered 70 or higher.

A detailed description of the drawings is given in the following paragraphs. However, for those familiar with the invention of my co-pending application, reference is immediately made to FIG. 1 for a description of the present invention and wherein there is illustrated the pilot passage 36 that is blocked by a pilot plunger 70 which in turn is reciprocably mounted in a pilot plunger bore 71 and engages a pilot drive means 72 to which it has a floating connection. The pilot plunger 70 has a cross-section large enough to block the bore of pilot passage 36 and is far smaller in diameter than the shut-off plunger 35 which latter is employed for blocking the nozzle passageway 9 as described below. The plunger 35 is, as described in said co-pending application, of a much larger diameter than the pilot passage 36 and of a diameter great enough to completely block the shut-off passageway 14. The shut-off plunger 35 cross-section is also sufficient to block the upper end of the pilot chamber 29 which chamber has a diameter where plunger 35 inserts substantially equal to the diameter of shut-off plunger 35. The plunger 35 has a length and is reciprocated through a stroke sufficient at one end to block the upper end of the pilot chamber in connection with blocking the shut-off passageway 14 and to open the passageway 14 at the other stroke end (dotted line position FIG. 1).

Supported on the underside of the valve body 20 is a single acting small diameter pneumatic piston-cylinder assembly comprising drive means 72 for the pilot plunger 70 which like the piston-cylinder assembly 39, is preferably a poppet-type shut-off valve. Drive means 72 includes a cylinder 75 shaped like a square flanged (see FIG. 2) cup, spacers 76, piston 77, piston ring 78, adapter 79, and various cap screws 80, 81 to secure the cylinder, spacers and adapters together and to secure the drive means 72 to the valve body.

The pilot plunger 70 is engaged by but is not screwed or otherwise secured to the underside of the pilot piston 77 to minimize alignment problems when assembling. The pilot cylinder cap 75 is bolted by a plurality of cap screws 80 through lugs 82 which are the corners of a square flange. The pilot cap 75 has a suitable air passage 84 for inlet and outlet air to the top of the piston. The spacers 76 are a thermal insulation preferably of a high softening point polyamide is between the cylinder 75 and the adapter or base 79. The insulating spacer protects the piston ring which may be of a resilient polymer or alternatively the piston ring may be graphite or carbon segments, or the cap 75 provided with a carbon bushing or lining.

The drawings show a nozzle shut-off valve 1 according to the invention interposed between a nozzle 2 and the combined plastication-injection unit 3 of an injection molding machine. The plastication unit has a well-known structure that terminates in a cylinder end cap 5 which is bolted by bolts or cap screws (not shown) to the end of the barrel and has therethrough a central axial passage 9. A plastication screw 10 is mounted in the barrel and can both rotate and reciprocate therein. The axis 11 for the passage extends not only through the cylinder end cap 5 but also through the nozzle and the shut-off valve in a substantially straight line. There are a series of passageways defining the plastic flow path beginning with the central axial passage 9, followed by a shut-off passageway 14 through the shut-off valve and then a nozzle passage 15.

In the illustrated embodiment the nozzle 2 is shown as an assembly of a nozzle tip 16 and nozzle body 17 although it is to be understood that a one-piece nozzle of appropriate length and size could be used. Heater bands and thermocouples to control them are supplied as needed to the nozzle, cylinder end cap, and nozzle barrel. Suitable threaded connections 18, 19 secure the nozzle tip to the nozzle body and further fixedly secure the nozzle body into the downstream end of the shut-off valve body 20 which will be further described below.

The shut-off valve is an assembly of a number of components including a valve body 20 having therethrough the shut-off passageway 14 which, as already noted, is substantially coaxial with the central passage in the cylinder end cap. The upstream end of the valve body has a externally threaded connection member 23 that threadably engages the adapter 24 which in turn is mounted by a plurality of bolts 25 to the cylinder end cap.

A lateral bore 28 is located in said body to intersect, preferably substantially perpendicularly, the shut-off passageway and to define at one end of the bore a pilot chamber 29 disposed on one side of the shut-off passageway. The bore 28 section on the opposite side of the passageway 14 from the pilot chamber slidably receives and supports the plunger 35. The pilot chamber is further defined by a plug 30. The advantages of the plug 30 closure and its type of construction are explained in my said patent application. A thermocouple and its well may be provided in a manner similar to that in my said patent application.

A plunger 35 is reciprocably mounted in the bore 28 and has a cross-section sufficient to completely block the shut-off passageway 14 at the location where the bore and passageway intersects. Minimum clearance for permitting reciprocation of the plunger is provided so that leakage along the bore will be minimized. The plunger cross-section is also sufficient to block the upper end of the pilot chamber 29 when the plunger is inserted therein. The plunger has a length and is reciprocated through a stroke sufficient to block the upper end of the pilot chamber as shown in solid lines in FIG. 1 and thereby to block the shut-off passage but yet to open the shut-off passage when retracted to the dotted line position of FIG. 1.

A pilot passage 36 is formed in the body and establishes communication between the pilot chamber and a point upstream of the aforesaid bore-passageway intersection. The pilot passage permits the flow of plastic material through itself into the pilot chamber and the application of the pressure of the plastic material to the end of the plunger when same is located in the pilot chamber. The pilot passage may be formed in a convenient manner by drilling intersecting holes from the outside of the valve body into the pilot chamber and passageway, respectively, closing each hole with a threaded connector such as a pipe plug. If desired, plugs like 30 can be inserted in the outboard volumes of such pilot passage drillings.

Superimposed on the valve body is a single acting pneumatic piston-cylinder assembly 39 acting as drive means for the plunger 35. Due to the size of the piston 40, I prefer to describe this as a poppet type shut-off valve.

The plunger 35 is engaged by but is not screwed or otherwise secured to the underside of the piston 40; this minimizes alignment problems when assembling the valve. The piston 40 preferably has piston rings 41 and in turn is reciprocably fitted into the pneumatic cylinder cap 42. The cylinder cap is bolted by cap screws 43 through lugs 44 to the cylinder base 45. The cap has a suitable air passage 47 for inlet and outlet air to the top of the piston. An insulating spacer 49 preferably of a high softening point (1000° F.) polyamide, is between the cap and the cylinder base. Alternatively, the piston ring may be of graphite carbon or the cap 42 can be lined with a carbon brushing.

The piston-cylinder assembly is mounted by a plurality of bolts 50 to the valve body 20 from which it is spaced by a hollow cylindrical spacer 52 through which each bolt 50 passes.

A typical sequence of operation using compressed air will now be described. We assume a starting position where both of the valves are in the closed position as indicated by the solid line position of plungers 35 and 70 in FIG. 1. The cycle of operations will include moving both plungers to the dotted line positions shown therefore and then returning them to the solid position. Also at the outset it will be recalled that both of the valves are being held in the closed position by air pressure applied through their respective inlets 47 and 84 so as to keep the piston in the positions illustrated there. At this point in time the screw 10 will have retracted to the right as much as required while plasticating a shot or the correct volume of plastic. As the screw is then started to the left in order to begin a shot, the pressure of the molten plastic builds up in the passageways 9, 14 and 36. At some point during this pressure build-up the air pressure in both cylinders is released whereupon the pressure in passage 36 forces the pilot plunger 70 down (as seen in FIG. 1) whereupon the pilot passageway is opened into chamber 29 and the plunger 35 is driven up and out thereby opening the passageway 14 completely whence the injection process continues. At some predetermined point in the low pressure (that is, molten plastic pressure) phase of the injection cycle the two valves are closed by the application of compressed air to the piston. While it is possible to apply the air simultaneously to both pistons to achieve the closing, I definitely prefer to first close the main shut-off valve 35 and then to close the pilot valve 70.

If for some reason the trapped volume of plastic in the short passageway 88 and pilot chamber 29 is excessive, a small diametral clearance is provided between the cylindrical plunger 70 and its matching circular bore to lead the molten plastic along the plunger to a bleed path 89.

Figure 5:
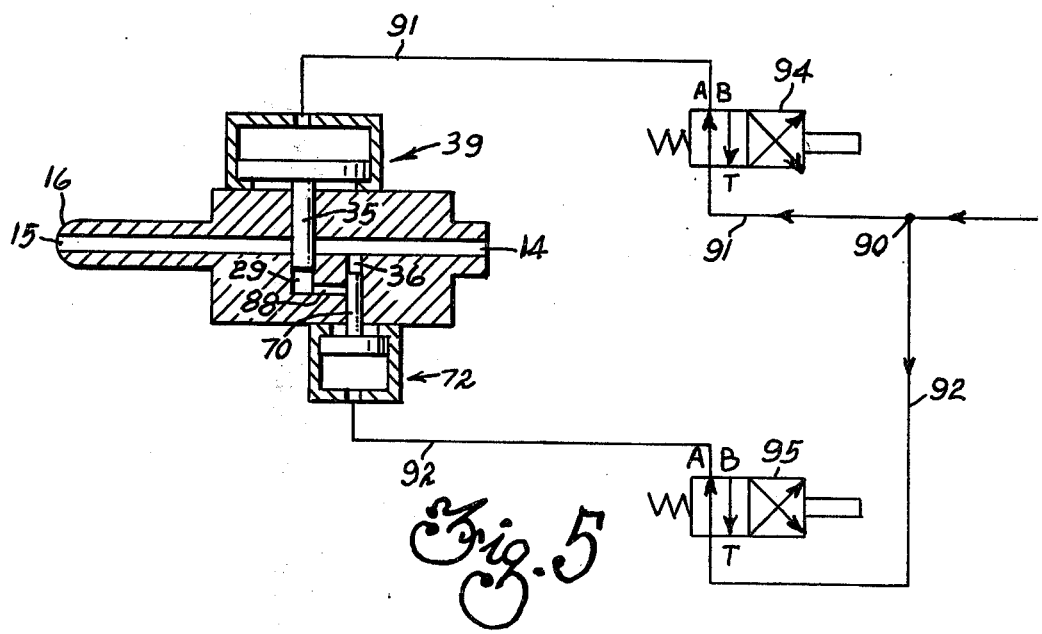
FIG. 5 schematically shows in a normally closed position (i.e. during plastication) a preferred pneumatic circuit for operating the shut-off and pilot valves.

FIG. 5 shows a preferred pneumatic system for controlling the shut-off and pilot valves in the position assumed during plastication when the shut-off valve prevents flow through the coaxial passages 9, 14, 15 etc. Compressed air is supplied through conduits from a common source to a junction 90 where the air flow splits into two channels, one each 91, 92 for shut-off and pilot, respectively. Air supply, of course, is via tubing or pipe. Interposed in the shut-off control air line 91 is a solenoid operated valve 94 and similarly a solenoid valve 95 is in the pilot valve air line — each valve 94, 95 controlling air flow in and out of its respective cylinder 39, 72. Both control valves have their B ports plugged closed, and their solenoids are in electrical parallel and operated by an electrical switch (not shown) which switch may in turn be manually closed and opened by the injection machine operator but preferably is a conventional limit switch (not shown) actuated to a closed position by the plastication unit when the screw 10 is fully retracted — the position at which the quantity (volume) of plastic for the next injection is ready. Closing of the switch actuates both solenoids 94, 95 moving the two control valve pistons to an open (i.e. plastic flow) position, whereupon pilot plunger 70 moves open and plastic flows through passages 36 and 88 into chamber 29 thereby pushing plunger 35 open and flow commences through a passageway 14.

Pneumatically, the compressed air is released from the respective cylinders, flowing back through lines 91, 92 to ports A thence crossing over to port T and exhausting to atmosphere. Plugged ports B avoid loss of incoming air to atmosphere.

Preferably a delay device is in the shut-off valve 72 circuit to allow the pilot to close last. Most conveniently, this is a delay relay in the circuit to the solenoid of valve 95.

What is claimed is:

1. In combination with a nozzle shut-off device that is for use with and at a location between the nozzle and plastication-injection unit of a plastic injection molding machine wherein the nozzle has a substantially straight first passageway that is substantially coaxial with the exit passage from the plastication-injection unit and wherein the shut-off device includes a body member that is interposed between the nozzle and such injection unit and has a substantially straight shut-off passageway therethrough that becomes coaxial with said first and exit passages, a laterally extending plunger slidably fitted in a bore which intersects the shut-off passageway in the body and which has a length and size sufficient to completely block said shut-off passageway and a plunger drive means engaging one end of said plunger, a pilot chamber under the opposite end of said plunger and at one end of said lateral bore and a pilot passage extending from said chamber to a location upstream of the intersection of the bore and shut-off passageway, the improvement that comprises:
    a pilot bore intersecting said pilot passage;
    a pilot plunger slidably supported within said bore and of a size to block said bore and movable through a stroke to open and close said pilot bore; and
    a pilot drive means engaging said pilot plunger for driving said pilot plunger through said stroke to a position to close said bore;
    said pilot and pilot plunger each having a cross-section less than said shut-off bore and shut-off plunger.

2. A nozzle shut-off device according to claim 1 further comprises said shut-off bore and said pilot bore being arranged along parallel axes.

3. A nozzle shut-off device according to claim 2, wherein both said bores are substantially perpendicular to said exit passage.

4. A nozzle shut-off device according to claim 1 wherein said pilot bore is substantially coaxial with and intersects said pilot passage, is of a cross-sectional size and shape substantially the same as said pilot passage, and said pilot plunger is of a size and stroke to interpose itself between the upstream end of said pilot passage and said pilot chamber to block said pilot passage.

5. A nozzle shut-off device according to claim 1 wherein each of said drive means is a piston and cylinder assembly that engages its respective plunger to drive same along its bore to block, respectively, said exit passage and said pilot passage.

6. A nozzle shut-off device according to 5 wherein said each of said drive means is a pneumatic piston and cylinder and further comprising means for connecting both said piston and cylinder combination to a source of compressed gas.

* * * * *